(No Model.)
J. HARLEY.
BAND SAW MILL.
No. 512,107. Patented Jan. 2, 1894.
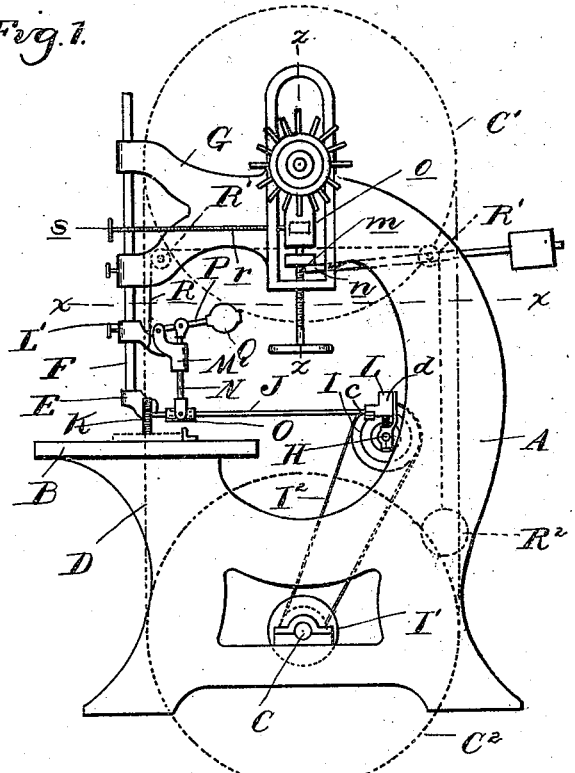
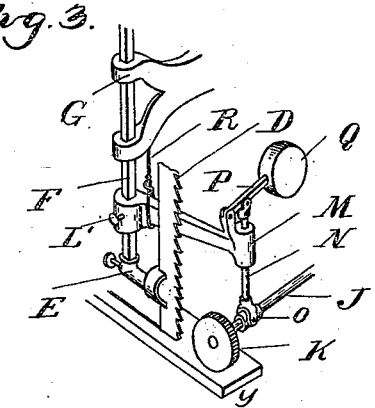
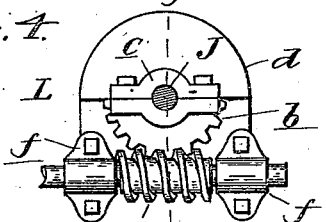
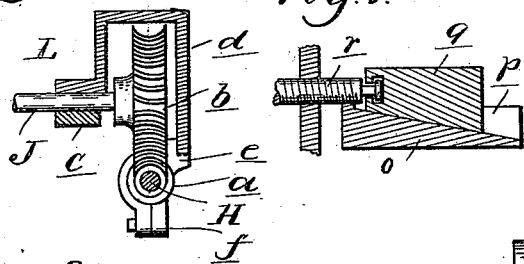
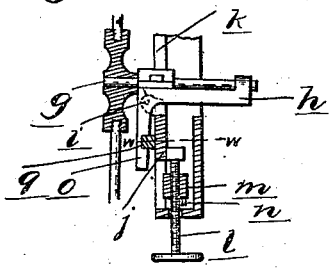
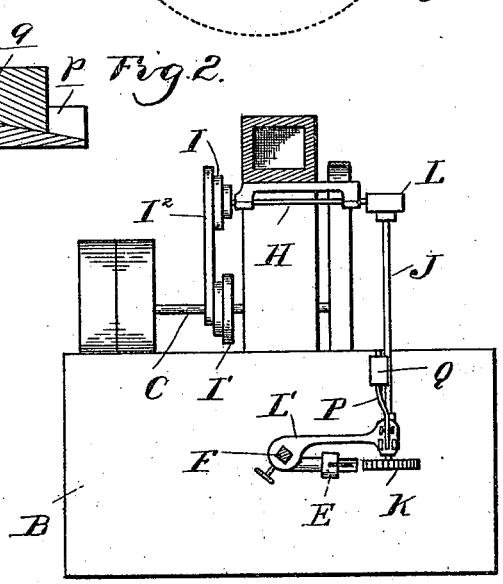
Witnesses
A. L. Hobbie
N. L. Lindop
Inventor
John Harley
By Thos. S. Sprague & Son
Attys.

UNITED STATES PATENT OFFICE.

JOHN HARLEY, OF DETROIT, MICHIGAN.

BAND-SAW MILL.

SPECIFICATION forming part of Letters Patent No. 512,107, dated January 2, 1894.

Application filed November 14, 1892. Renewed October 26, 1893. Serial No. 489,235. (No model.)

*To all whom it may concern:*

Be it known that I, JOHN HARLEY, a citizen of the United States, residing at Detroit, in the county of Wayne and State of Michigan, have invented certain new and useful Improvements in Band-Saw Mills, of which the following is a specification, reference being had therein to the accompanying drawings.

This invention relates to an improvement in band saw mills and it consists in the construction and arrangement of parts hereinafter described and definitely pointed out in the claims.

In the drawings, Figure 1 is a side elevation of a band saw to which my device is attached. Fig. 2 is a horizontal section on line $x\ x$ Fig. 1. Fig. 3 is a perspective view of the saw guide and feed wheel. Fig. 4 is an elevation of the worm gear drive connection for the feed wheel. Fig. 5 is a section on line $y\ y$ Fig. 4. Fig. 6 is a section on line $z\ z$ Fig. 1. Fig. 7 is a section on line $w\ w$ Fig. 6.

A is the supporting frame, B the work table, C the drive shaft, C' and $C^2$ the upper and lower band wheels, D the band saw, and E the saw guide, secured at the lower end of the standard F, which is adjustably secured in the extension G of the frame, all of usual and known construction.

H is a counter shaft journaled in suitable bearings on the frame A in the rear of the saw table and at approximately the level thereof, to which power is transmitted from the drive shaft C through the cone pulleys I and I', and belt $I^2$.

J is the feed shaft extending at right angles to the shaft H across the feed table and carrying at its free end the feed wheel K.

The connection between the shafts H and J is preferably of the following construction: $a$ is a worm secured to the shaft H. $b$ is a worm wheel upon the shaft J, meshing therewith, journaled in the bearing $c$ secured to a frame $d$ supported upon the bifurcated standards $e$ provided with the bearings $f$ supported upon the shaft H on opposite sides of the worm (Fig. 4). This construction holds the two shafts in proper relation and allows the feed shaft to move about the shaft H as its pivot.

L' is a bracket arm adjustably secured upon the standard F of the saw guide E.

M is a vertical guide block formed on the free end of the bracket L'.

N is a rod slidingly secured in the guide block M.

O is a box in which is journaled the outer end of the feed shaft J and which is pivotally supported at the lower end of the rod N.

P is a counter weighted lever pivoted to the bracket L', having pivotal connection with the upper end of the rod N.

R is a chain or rope attached to the bracket L' which passes over sheaves R' upon the frame and its other end carries the counter weight $R^2$.

In practice the operator adjusts the saw guide E a proper distance above the table to admit the lumber underneath. The arm L' is then so adjusted as to allow the feed wheel K to rest upon the work, upon which it is pressed by its own weight and that of the counter-weighted lever P. After the parts have been once adjusted in this manner if it is desired to saw a greater or less thickness of lumber it is simply necessary to adjust the saw guide E up or down which will carry the feed wheel with it. The counter weight $R^2$ balances the weight of the saw guide and feed wheel and enables the operator to easily handle the feed mechanism.

In Figs. 6 and 7, I show an attachment for angular adjustment of the band saw wheel, in which, $g$ is the shaft of the upper band wheel C', $h$ the bearing in which said shaft is journaled, which is pivotally secured at $i$ to a sliding head $j$ vertically adjustably secured in guide ways $k$ in the frame A, by means of the adjusting screw $l$ passing through the nut $m$ on the counter-weighted lever $n$, the parts so far described being of the usual construction. $o$ is a downward projecting arm on the bearing $h$, $p$ an inclined bearing in the arm $o$. $q$ is a wedge adapted to fit said bearing, its inner face resting against the sliding head $j$. $r$ is a screw shaft engaging in a suitable screw threaded aperture in the frame A and having a swivel connection with a wedge $q$. This shaft extends outward to the point beyond the front of the frame and it is provided at its free end with a hand wheel s. By adjusting the wedge in or out, the band wheel will be rocked upon the pivot i giving it the required angular adjustment. This may be done while the machine is running.

What I claim as my invention is—

1. The combination with the saw and feed table, of the feed shaft, a feed wheel on the free end of the shaft, a standard a saw guide on the standard, a bracket on the standard a weighted lever on the bracket and a connection between the lever and shaft whereby the weight of the lever is transmitted to the feed shaft, substantially as described.

2. The combination with the saw and the feed table, of a horizontal feed shaft, a drive shaft, a worm on the drive shaft, a worm gear wheel on the feed shaft engaging the worm a feed wheel upon the free end thereof, a bearing near the outer end of said shaft, and a weighted lever, pivoted adjacent to the shaft and pivotally connected to said bearing, substantially as described.

3. The combination with the saw and the feed table, of a drive shaft at the rear of the feed table, a bracket pivotally supported thereon, a horizontal feed shaft journaled in said bracket at right angles to the drive shaft, a worm on the drive shaft, a worm gear wheel on the feed shaft engaging the worm, and a feed wheel at the free end of the feed shaft, substantially as described.

4. The combination with the saw and the feed table, of a horizontal drive shaft at the rear of the feed table, a bracket pivotally supported thereon, a horizontal feed shaft journaled in said bracket at right angles to the drive shaft, a worm on the drive shaft, a worm gear wheel on the feed shaft engaging the worm, a feed wheel at the free end of the feed shaft, a bracket above the feed shaft, a bar engaging in vertical bearings in said bracket, pivotally secured at its lower end to the feed shaft, and a weight at the upper end of said bar, substantially as described.

5. The combination with the saw and feed table, of the feed shaft, the feed wheel a standard, an adjustable saw guide, a bracket on the standard, a weighted lever on the bracket, transmitting its weight to the feed shaft, a counterweight for the bracket and connecting mechanism, therefor substantially as described.

6. The combination with the saw, the feed table and the frame, of a vertical bearing on the frame, a standard adjustably secured in said bearing, a saw guide secured to the standard, a bracket having a vertical adjustment on the standard and a feed shaft carrying the feed wheel supported from said bracket, substantially as described.

7. The combination with the saw, the feed table and the frame, of the saw guide a standard, a bracket extending from said standard, a feed shaft, a feed wheel at the free end of said shaft, a weighted lever pivoted at the end of the bracket and a connecting rod pivoted at its free end to the lever and at its lower end to a bearing on the feed shaft, substantially as described.

In testimony whereof I affix my signature in presence of two witnesses.

JOHN HARLEY.

Witnesses:
   M. B. O'DOGHERTY,
   N. L. LINDOP.